March 6, 1962 J. J. NAWROT 3,023,853
BRAKE ACTUATING MECHANISM
Filed June 11, 1958
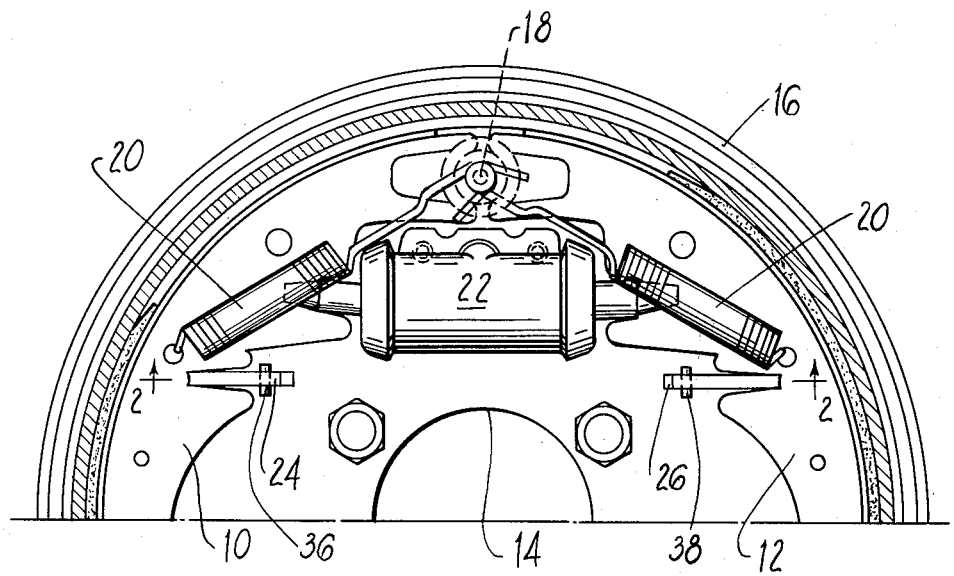
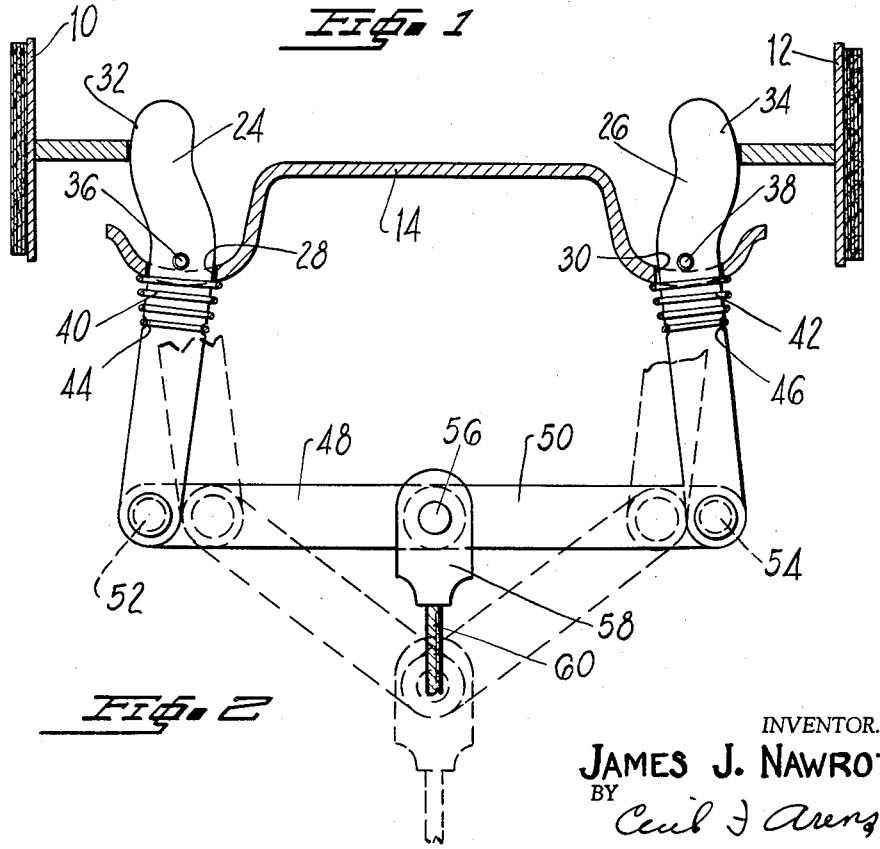
INVENTOR.
JAMES J. NAWROT
BY
Cecil J Arens
ATTORNEY United States Patent Office 3,023,853
Patented Mar. 6, 1962

3,023,853
BRAKE ACTUATING MECHANISM
James J. Nawrot, South Bend, Ind., assignor to The Bendix Corporation, a corporation of Delaware
Filed June 11, 1958, Ser. No. 741,251
4 Claims. (Cl. 188—78)

This invention relates to brake actuating mechanism comprising mechanical means for spreading apart the adjacent separable ends of a pair of brake shoes in a brake of the internally expanding type.

The most widely used mechanical brake actuating mechanism, which is employed primarily in conjunction with a hydraulic brake and is used as an auxiliary or emergency brake, requires that the pull of the brake cable be substantially parallel to the backing plate of the brake or substantially perpendicular to the rear axle of the vehicle. Because of changes in the basic structural framework that are being proposed for today's modern automobiles, it may become impractical and even impossible to provide them with a mechanical brake actuating mechanism which requires that the actuating force be substantially parallel to the brake backing plate. Therefore, it has become necessary to provide a brake actuating mechanism which can be applied by a cable pull substantially perpendicular to the backing plate or parallel to the vehicle axle. There are numerous other applications in which the particular design requires that the cable pull be perpendicular to the backing plate of the brake, and my invention can be readily utilized in any of them.

There are well known in the art numerous mechanical brake actuating mechanisms which are actuated by a cable pull perpendicular to the backing plate of the brake. However, most of these actuating mechanisms with which I am familiar require substantial modification of conventional brake structure; they are also relatively complex in structure and are, therefore, expensive to manufacture.

It is, therefore, a primary object of the present invention to provide a mechanical brake actuating mechanism which can be applied by force exerted perpendicular to the backing plate of the brake.

It is a further object of my invention to provide a mechanical brake actuating mechanism of the type discussed which can be readily adapted to conventional brake structures without requiring substantial modification thereof.

It is still a further object of my invention to provide a mechanical brake actuating mechanism which employs a minimum number of parts, many of which are identical and, therefore, inexpensively mass produced. In so doing, I provide a simple mechanism which is easy to install, efficient in operation, and is practically free from problems of malfunctioning.

These and other objects and features of my invention will become apparent from the following description which precedes with reference to the accompanying drawings wherein my invention is illustrated by way of example.

In the drawings:

FIGURE 1 is a side elevation showing a part of a brake assembly which incorporates the improved mechanical brake actuating mechanism;

FIGURE 2 is a view of the mechanical brake actuating mechanism illustrated by taking the view on the section line 2—2 of FIGURE 1.

The present invention is not primarily concerned with the arrangement of the brake shoes or the particular characteristics of operation thereof. However, for purposes of illustration only, I have shown a part of a brake assembly of the general type shown and described in Bradley et al., U.S. Patent No. 2,554,291. It should be understood, however, that my invention is not limited in use to this type of brake assembly but can also be utilized, for example, in conjunction with a brake assembly of the type shown in House, U.S. Patent No. 2,509,643.

The brake assembly of FIGURE 1 comprises a pair of brake shoes 10 and 12 mounted on a backing plate or support member 14 within a rotatable drum 16. The shoes may be anchored at one pair of ends on an anchor member 18 with their other ends interconnected by a floating adjustable link such as that shown in Bradley et al., U.S. Patent No. 2,554,291. To maintain the separable ends of the shoes 10 and 12 normally in contact with the anchor member 18, suitable return springs 20 are provided. To actuate the brake as a service brake, I provide a conventional hydraulic wheel cylinder 22 which is located on the backing plate 14 between the separable ends of the shoes 10 and 12.

I also provide as an auxiliary, emergency or parking brake a mechanical actuating mechanism for spreading the shoes 10 and 12 into engagement with the rotatable drum 16. This mechanical actuating mechanism comprises a pair of applying levers 24 and 26 which extend transversely to the backing plate 14 through openings or slots 28 and 30, respectively. Ends 32 and 34 of levers 24 and 26, respectively, engage the webs of shoes 10 and 12. To maintain the applying levers 24 and 26 in position relative to the backing plate, I provide pins 36 and 38 each received transversely through its respective lever. As can best be seen in FIGURE 2, these pins straddle the slots 28 and 30 and bear against the backing plate 14. I prefer to make these pins of a circular cross-section to decrease the friction between the pins and backing plate during actuation of the mechanism.

To prevent applying levers 24 and 26 from excessive movement within the slots 28 and 30 and also to maintain the pins 36 and 38 in contact with the backing plate 14, I provide suitable means such as springs 40 and 42 which are secured at one end to the levers 24 and 26 by means of notches 44 and 46 formed in the levers. The other end of each spring has a diameter greater than the length of the respective slot and thus the springs 40 and 42 bear on the backing plate 14.

Interconnecting the other ends of the applying levers 24 and 26 are two links 48 and 50. These links are secured to the applying levers 24 and 26 by means of pins 52 and 54 and are pivotally secured together by means of a pivot pin 56. Thus, the two links 48 and 50 and pin 56 form an articulate connection for a linkage that is sometimes referred to as a toggle. The pin 56 which connects the links 48 and 50 also provides for a connection of suitable means for exerting a pulling force on the mechanism. In FIGURE 2, I have shown a clevis 58 pivotally held to the links 48, 50 by the pin 56. A cable 60 or other suitable means is connected to the clevis 58 and has its other end operatively connected to a suitable operator controlled pedal or lever, not shown.

In operation, operator applied effort is exerted on the cable 60 which exerts a pulling force on the articulate connection formed by the pin 56 and links 48 and 50. This will move the links 48 and 50 out of line or, in other words, will open the toggle and cause the links 48 and 50 and levers 24 and 26 to move into the position shown by the dotted lines in FIGURE 2. The levers 24 and 26 are thus pivoted or fulcrumed on the backing plate 14 and their ends 32 and 34 are spread apart to cause the shoes 10 and 12 to engage the rotatable drum 16. It should be noted that the pull on the cable 60 is in a direction substantially perpendicular to the backing plate 14 and when this linkage is mounted on a vehicle rear brake the cable can extend parallel to the rear axle. It should be further noted that the linkage arrangement shown in my invention provides for substantially equal braking effectiveness in either forward or reverse direction of vehicle movement.

Upon release of the operator applied effort exerted on cable 60, the return springs 20 will return the brake shoes 10 and 12 to their normally retracted position against anchor 18 and force the applying linkage to its initial released position as shown in full lines in FIGURE 2.

It is readily apparent that I have attained the objects of my invention. The only necessary modification of conventional brake structure that is required to utilize my invention is the provision of slots 28 and 30 in the backing plate. I have provided a mechanism with a minimum of parts many of which can be inexpensively manufactured by a simple stamping operation. In this regard, it is apparent that levers 24 and 26 are identical, as are links 48 and 50.

Although my invention has been illustrated only in connection with certain specific brake structure, it will be apparent to those skilled in the art that the principles of the invention are broad in scope and are capable of general application. It is, therefore, my intention that such revision and variations of the invention as are reasonably expected on the part of those skilled in the art will be included within the scope of the following claims.

I claim:

1. In a brake, a pair of brake shoes arranged in end-to-end relation and each including a friction material lined rim and a transverse reinforcing web, a supporting plate having a reversely bent flange providing a recess therein at the periphery of said backing plate, two spaced slots in the base of said recess located substantially equidistant from the center of the backing plate and on a line located between the center of the backing plate and one of the adjacent pairs of ends of said brake shoes, two applying levers one fitted through each of said slots and proportioned of less width than the respective slot to be limitedly pivotal therein in a plane transverse to the plane of said supporting plate, a pin received through each said levers and extending across said slots to be in engagement at the opposite ends thereof with said supporting plate and thereby form abutments which retain said levers against movement through said slots and define locations for pivotal movement of said levers, an output end of each said levers bearing slidably against the web of a respective shoe to force the shoes radially outwardly, a toggle linkage having articulated members pivotally connected together and at their opposite ends to the ends of said levers projecting through said supporting plate, applying means operatively connected to said toggle linkage, and means for actuating said applying means in a direction perpendicular to said backing plate to operate said levers.

2. The brake structure in accordance with claim 1 including springs received over each of said levers and compressed between the surface of said backing plate and abutment means constructed integrally with said levers to urge said pins into engagement with said backing plate.

3. In a brake, a pair of brake shoes arranged in end-to-end relation and each including a friction material lined rim and a transverse reinforcing web, a supporting plate having a peripheral flange which is reversely bent to provide a concave inner surface two spaced slots in said reversely bent flange and extending transversely of said flange and located substantially equidistant from the center of the backing plate and on a line located between the center of the backing plate and one of the adjacent pairs of ends of said brake shoes, two applying levers one fitted through each of said slots and proportioned of less width than the respective slot to be limitedly pivotal therein in a plane transverse to the plane of said supporting plate, a pin received through each said levers and extending across the width of said slots and in sliding engagement with said supporting plate to be in engagement at the opposite ends thereof with said supporting plate and thereby form abutments which retain said levers against movement through said slots and define locations for pivotal movement of said levers, an output end of each said levers having a thrust connection with the web of a respective shoe to force the shoes radially outwardly, a toggle linkage having links including articulated connections fastened to the ends of said levers projecting through said supporting plate and further including an articulated connection fastening the other ends of said links together, and a cable secured to said toggle and tensioned in a direction perpendicular to the radial movement of said shoes to operate said toggle and levers.

4. The brake structure in accordance with claim 3 wherein the output ends of said levers are convexly curved and bear slidably against the outer edges of said webs within recessed portions of said webs to form said thrust connections therewith.

References Cited in the file of this patent

UNITED STATES PATENTS

| 370,170 | Wickey | Sept. 20, 1887 |
| 450,746 | Nolan | Apr. 21, 1891 |
| 1,970,680 | Williams et al. | Aug. 21, 1934 |
| 2,036,385 | Amirault | Apr. 7, 1936 |
| 2,144,019 | Goepfrich | Jan. 17, 1939 |
| 2,153,280 | Shelor | Apr. 4, 1939 |
| 2,554,291 | Bradley et al. | May 22, 1951 |

FOREIGN PATENTS

| 1,109,194 | France | Sept. 21, 1955 |
| 556,652 | Great Britain | Oct. 14, 1943 |